(12) United States Patent
Senge

(10) Patent No.: US 10,909,334 B2
(45) Date of Patent: Feb. 2, 2021

(54) METHOD OF MANUFACTURING CARDS WITH A TRANSPARENT WINDOW

(71) Applicant: HID Global Rastede GmbH, Rastede (DE)

(72) Inventor: Carsten Senge, Bad Zwischenahn Bloh (DE)

(73) Assignee: HID Global Rastede GmbH, Rastede (DE)

( * ) Notice: Subject to any disclaimer, the term of this patent is extended or adjusted under 35 U.S.C. 154(b) by 0 days.

(21) Appl. No.: 16/621,144

(22) PCT Filed: Jun. 22, 2018

(86) PCT No.: PCT/EP2018/066766
§ 371 (c)(1),
(2) Date: Dec. 10, 2019

(87) PCT Pub. No.: WO2019/002129
PCT Pub. Date: Jan. 3, 2019

(65) Prior Publication Data
US 2020/0202080 A1 Jun. 25, 2020

(30) Foreign Application Priority Data
Jun. 28, 2017 (EP) .................................... 17178287

(51) Int. Cl.
*G06K 19/02* (2006.01)
*G06K 1/12* (2006.01)
(Continued)

(52) U.S. Cl.
CPC ................ *G06K 1/12* (2013.01); *B32B 7/023* (2019.01); *B32B 37/02* (2013.01); *B32B 37/18* (2013.01);
(Continued)

(58) Field of Classification Search
CPC .......... G06K 1/12; B32B 7/023; B32B 37/02; B32B 37/18
(Continued)

(56) References Cited

U.S. PATENT DOCUMENTS

2014/0227488 A1  8/2014 Brehm et al.
2018/0339503 A1* 11/2018 Finn ..................... H01Q 1/2225

FOREIGN PATENT DOCUMENTS

AR            112425 A1   10/2019
CN         111051058 A     4/2020
(Continued)

OTHER PUBLICATIONS

"European Application Serial No. 17178287.3, Extended European Search Report dated Jan. 4, 2018", 5 pgs.
(Continued)

*Primary Examiner* — Jamara A Franklin
(74) *Attorney, Agent, or Firm* — Schwegman Lundberg & Woessner, P.A.

(57) ABSTRACT

The method comprises a pre-lamination step wherein a layer is placed in contact at least on one side with a lamination plate having a recess and the layer undergoes lamination such that a raised portion is formed on the layer; an assembling step wherein another layer is placed in contact with the layer, and the raised portion of the layer is at least partially placed in an opening of the other layer and a lamination step wherein said layers are laminated together.

22 Claims, 3 Drawing Sheets

(51) Int. Cl.
  *B32B 7/023* (2019.01)
  *B32B 37/02* (2006.01)
  *B32B 37/18* (2006.01)
  *B32B 38/18* (2006.01)
  *G06K 19/077* (2006.01)

(52) U.S. Cl.
  CPC .... *B32B 38/1808* (2013.01); *G06K 19/07749* (2013.01); *B32B 2305/342* (2013.01); *B32B 2305/347* (2013.01); *B32B 2307/41* (2013.01); *B32B 2307/412* (2013.01); *B32B 2519/02* (2013.01)

(58) Field of Classification Search
  USPC .................................................. 235/488, 492
  See application file for complete search history.

(56) References Cited

FOREIGN PATENT DOCUMENTS

| | | |
|---|---|---|
| DE | 10113476 C1 | 4/2003 |
| DE | 102012003603 A1 | 8/2013 |
| EP | 3421235 A1 | 1/2019 |
| WO | WO-2013124064 A1 | 8/2013 |
| WO | WO-2019002129 A1 | 1/2019 |

OTHER PUBLICATIONS

"European Application Serial No. 17178287.3, Response filed Jun. 18, 2019 to Extended European Search Report dated Jan. 4, 2018", 34 pgs.

"International Application Serial No. PCT/EP2018/066766, International Search Report dated Sep. 12, 2018", 3 pgs.

"International Application Serial No. PCT/EP2018/066766, Written Opinion dated Sep. 12, 2018", 5 pgs.

"European Application Serial No. 17178287.3, Communication Pursuant to Article 94(3) EPC dated Jul. 8, 2020", 3 pgs.

"European Application Serial No. 17178287.3, Response filed Jul. 23, 2020 to Communication Pursuant to Article 94(3) EPC dated Jul. 8, 2020", 17 pgs.

"Indonesian Application Serial No. P00202000583, Notification of Lack of Physical Requirements dated Jan. 28, 2020", w/o English Translation, 4 pgs.

\* cited by examiner

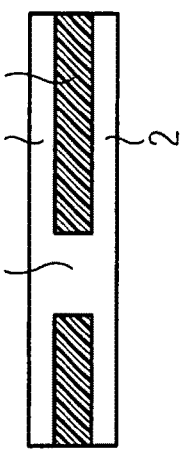
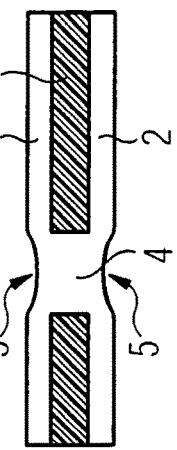
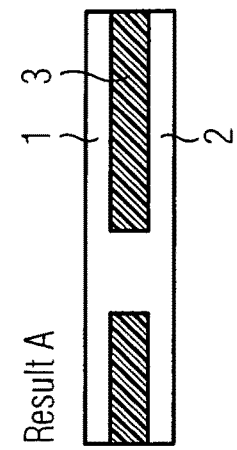
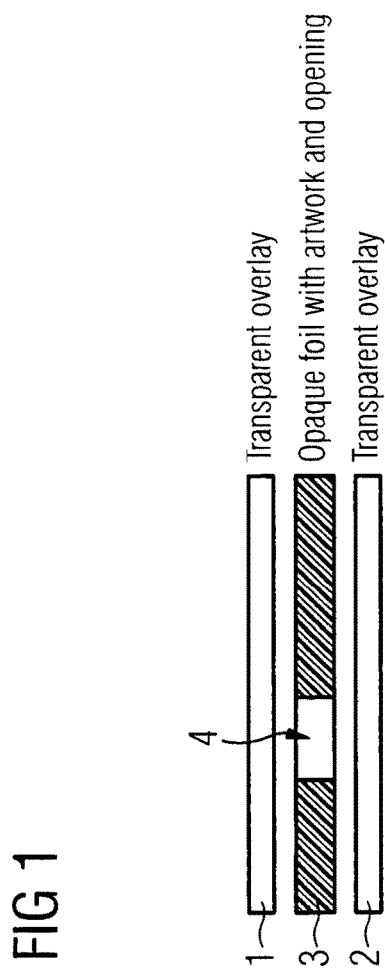
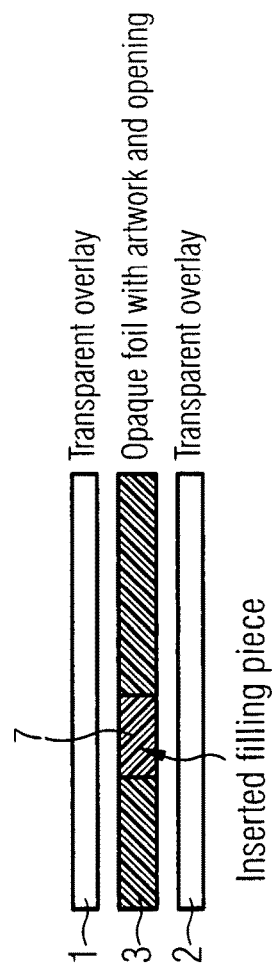

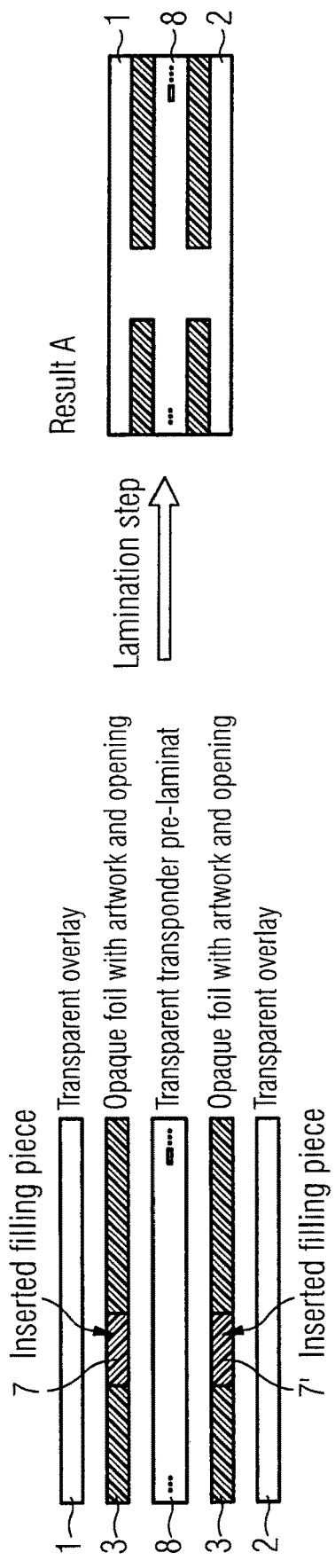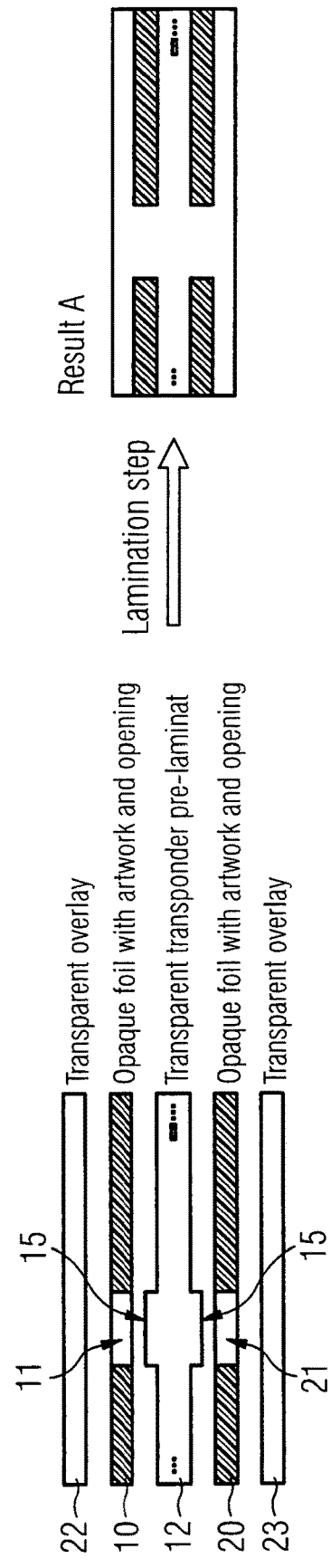

METHOD OF MANUFACTURING CARDS WITH A TRANSPARENT WINDOW

CROSS-REFERENCE TO RELATED APPLICATION(S)

This application is a national stage application of International PCT patent application no. PCT/EP2018/066766, filed Jun. 22, 2018, titled "Method of Manufacturing Cards with a Transparent Window," which claims priority to European patent application no. 17178287.3, filed Jun. 28, 2017, each of which is hereby incorporated by reference herein in its entirety.

TECHNICAL FIELD

The present invention concerns the field of contactless cards such as RFID cards and documents with an RFID capability.

More specifically, the present invention is in the field of such cards and documents that include a transparent window.

BACKGROUND ART

RFID cards and documents (hereinafter referred to as cards) are known in the art. Usually, these cards are made of several layers that are laminated together to form an inlay as a semi-finished part of a card or a card itself In some cases, the card comprises an element in the form of a transparent window that provides both a security and differentiating feature. For example, publication WO 2017/006191 discloses a security document comprising at least an antenna and a chip connected to the antenna. The described security document comprises at least one transparent window arranged in such a way that at least a part of the antenna is visible in the window thereby forming a visible security feature for the document.

Moreover, FIGS. 1 to 5 of the present application illustrate principles that are known in the art for the construction of RFID cards.

For example, FIG. 1 illustrates schematically an inlay comprising three layers, e.g. outer layers 1, 2 and inner layer 3: layer 1 and 2 are cover layers and are made of a transparent material, such as PC, PET, TPU, PVC for example. Other materials are of course envisageable as well.

Layer 3 is an inner layer that is opaque and that comprises at least one cavity 4 (or opening or hole) extending through the entire layer 3, that creates a transparency feature of the inlay since layer 3 is opaque and layers 1 and 2 are transparent.

To form an inlay with the above-mentioned layers, they are stacked one over the other and then laminated together with heat and pressure. The obtained result is illustrated in FIG. 2 where the inner layer 3 is covered on both sides by the two cover layers 1 and 2, the material of both cover layers 1 and 2 filling the opening 4 as a result of the heat and pressure applied in the lamination step. As illustrated in FIG. 2, the filling of the opening 4 has in theory no influence on the surfaces of the layers 1 and 2.

However, this is a theoretical case when the thickness of the inner layer 3 is smaller (or substantially smaller) than the thickness of the cover layers 1 and 2, or when the opening 4 is small.

In actual practice, the result of the lamination of such layers 1-3 is rather the one illustrated in FIG. 3 where the cover layers 1 and 2 show a local collapse 5, 6 of material in the region where the opening 4 is located. This results in the inlay being defective and having to be rejected in the manufacturing process.

Such a defect has to be avoided since the cover layers must be flat or else they are unsuitable for use. Additionally, the inlays are produced industrially at high production rate. Batches of products that are defective must be discarded significantly increasing manufacturing costs.

This problem is not limited to the simple inlay configuration illustrated in FIG. 1 but is present in other configurations when more layers are present than in the examples of FIGS. 1-3. Generally, this defect is always present when at least one layer comprises a hole or an opening (or cavity), even when the said hole does not extend through the entire layer, and this layer is covered by another layer and then the layers are laminated. The absence of material due to the presence of the hole (cavity) is compensated by a local flow of material in the opening during the laminating step and the result of FIG. 3 is most probable, especially when the thickness of the layer with an opening is larger than the thickness of the layer(s) covering the opening, or if the opening has a large diameter.

One solution developed in the prior art has been to add a filling part in the opening 4 of the covered layer as a support for the cover layers and to avoid material flow in the opening and creation of above mentioned defect forming an uneven surface of the end product. This solution is illustrated in FIG. 4 which shows a construction similar to the one of FIG. 1 but with an additional filling part 7 placed in the opening 4. The filling part 7 is typically and preferably made of transparent material in order to maintain the desired transparent window of the inlay and the final result after lamination of the layers is similar to the one FIG. 2 but with the addition of a filing part 7 in the opening. This result is illustrated on the right side of FIG. 4. A common technology is to punch a little piece of transparent foil in the shape of the window and weld it at the designated window position onto the transparent inlay (or rather two on both sides of the inlay).

As a more concrete example, the solution using a filling 7 part may be applied to the manufacturing of cards with a transponder such as RFID products. Such a product however necessitates the use of two opaque layers 3 and therefore two filling parts 7, 7' in application of the principles exposed above. An example of this construction is given in FIG. 5 with a middle layer 8 being a transponder inlay (comprising for example an RFID antenna and a chip, both connected to each other). The result of the lamination of this construction is illustrated on the right side of FIG. 5.

The solution using a filling part 7 is however not practical for several reasons, among others:
- it necessitates the handling of an additional part (i.e. the filling part(s) 7, 7'),
- the filling part(s) 7/7' may be a small of very small item and thus be difficult to handle properly,
- once in place, it has to be ensured that the filling part(s) 7/7' remains in position until the cover layers or outer layers are placed on each side of the opaque (inner) layer containing the filling part (s),
- it has to be ensured that the filling part(s) 7/7' is(are) properly positioned in the opening, in order not to create another defect on the card,
- if a filling part 7/7' falls from the opening, it may jeopardize the manufacturing process or damage the production machine, or a tool or at least create a stoppage.

All these risks and potential problems get even worse in the example of FIG. 5 where two filling parts 7, 7' are needed, thus increasing the risk of malfunction.

To summarize, if this solution of using a filling part appears simple at first sight, it has many disadvantages and renders the production process more complicated, more expensive, with more risks for defects and is therefore not a suitable direction for industrial purposes and high production rates.

For the sake of completeness, DE 10 2012 003 603 A1 and DE 101 13 476 C1 are mentioned. DE 10 2012 003 603 A1 refers to a method for producing an electronic module having a contact device. The known method comprises the following steps: A carrier layer and at least one electrically conductive layer are made provided. The at least one electrically conductive layer is applied to the carrier layer by lamination, using a lamination sheet or the like to form the contact device of the module. The lamination sheet has at least one recess into which the electrically conductive layer is pressed during lamination, thereby forming at least one raised portion in the electrically conductive layer such that the contact device and the electrical component of the data carrier base can be contacted via the at least one raised portion when the module is embedded into the data carrier base. DE 101 13 476 C1 refers to a method in which a coil structure is applied to a core layer and overlaid by an equalisation layer with openings corresponding to the coil structure. A rear side of the core layer is provided with an equalisation structure corresponding to these openings, before a lamination between lower and upper outer layers is carried out.

SUMMARY OF THE INVENTION

It is therefore an aim of the present invention to improve the known processes, methods and products.

A further aim of the present invention is to provide a method that allows the production and manufacturing of RFID cards and transponders in a simple and safe manner.

A further aim of the present invention is to provide a method that is efficient and which does not have possible defects of the known methods.

According to one aspect, the present disclosure refers to method for manufacturing a card product, such as a RFID transponder, with several laminated layers. The method comprises at least a first pre-lamination step, an assembling step and a lamination step. The pre-lamination step includes the steps of providing a lamination plate having a recess, providing a second layer, placing the second layer in contact at least on one side with the lamination plate, and laminating the second layer using the lamination plate such that a raised portion is being formed on the second layer in the recess of the lamination plate. The assembling step includes providing a first layer having an opening and placing the first layer in contact with the second layer such that the raised portion of the second layer is at least partially placed in the opening of the first layer. The lamination step includes laminating the assembled first and second layers together, preferably with heat and pressure.

According to another aspect, the present disclosure refers to a method for manufacturing a RFID transponder. The method comprises first and second pre-lamination steps, an assembling step and a lamination step. The first pre-lamination step includes providing a lamination plate having a recess, providing an RFID transponder inlay comprising a chip or chip module and an antenna connected to the chip/chip module, placing a first side of the RFID transponder inlay in contact with the lamination plate, and laminating the RFID transponder inlay using the lamination plate such that a raised portion is formed on the RFID transponder inlay in the recess of the lamination plate. The second pre-lamination step includes providing a further lamination plate having a recess, placing a second side opposite to the first side of the RFID transponder inlay in contact with the further lamination plate, and laminating the RFID transponder inlay using the further lamination plate such that a raised portion is formed on the second side of the RFID transponder inlay in the recess of the further lamination plate. The assembling step includes providing a first layer having an opening, providing a third layer having an opening, placing the first layer in contact with the RFID transponder inlay such that the raised portion of the RFID transponder inlay is at least partially placed in the opening of the first layer, and placing the third layer in contact with the second layer such that the raised portion of the RFID transponder inlay is at least partially placed in the opening of the third layer. The lamination step includes laminating the first layer, the RFID transponder inlay and the third layer together with heat and pressure.

In an exemplary embodiment, the step of laminating the assembled layers is preferably made for all layers at a same time.

In another exemplary embodiment, the prelamination steps of the layers are made in parallel.

In another exemplary embodiment, the other layer is an opaque layer.

In another exemplary embodiment, the layer is a transparent layer.

In another exemplary embodiment, the further layer is an opaque layer.

In another exemplary embodiment, the layer is an RFID transponder inlay.

In another exemplary embodiment, the RFID transponder inlay comprises a chip or chip module and an antenna connected to said chip or chip module.

In another exemplary embodiment, the method further comprises at least one covering layer laminated on one of the layer or further layer.

In another exemplary embodiment, the plate with a recess is formed by a plate and a foil with an opening which is placed on said plate thus forming the recessed construction.

According to another aspect, the present disclosure refers to a product manufactured by the method as defined herein. A product may comprise a first layer having an opening, a second layer integrally formed with a raised portion by means of a lamination step using a lamination plate with a recess, the raised portion of the second layer is at least partially placed in the opening of the first layer, and the first and the second layers are laminated together.

In another exemplary embodiment, the product is a RFID transponder. The RFID transponder card may comprise a first layer having an opening, a third layer having an opening, and an RFID transponder inlay. The RFID inlay transponder comprises a chip or chip module and an antenna connected to said chip/chip module. The RFID transponder inlay is integrally formed with a first raised portion on a first side of the RFID transponder inlay and a second raised portion formed on the opposite second side of the RFID transponder inlay by means of at least one lamination step using lamination plates, each one of the lamination plates comprising a recess. The first and third layers are laminated on the first and second sides of the RFID transponder layer such that the raised portions of the RFID transponder inlay are at least partially placed in the respective opening of the first and third layers.

BRIEF DESCRIPTION OF THE DRAWINGS

FIG. 1 illustrates schematically a first method to produce a laminated product according to the prior art;

FIGS. 2 and 3 illustrate schematically the ideal result (FIG. 2) and the concrete result (FIG. 3) of the method of FIG. 1;

FIGS. 4 and 5 schematically illustrate a solution of the prior art used to overcome the problems illustrated by the result of FIG. 2;

FIG. 6 schematically illustrates an exemplary embodiment of the method of the present invention and its result;

DETAILED DESCRIPTION

Figure 7:
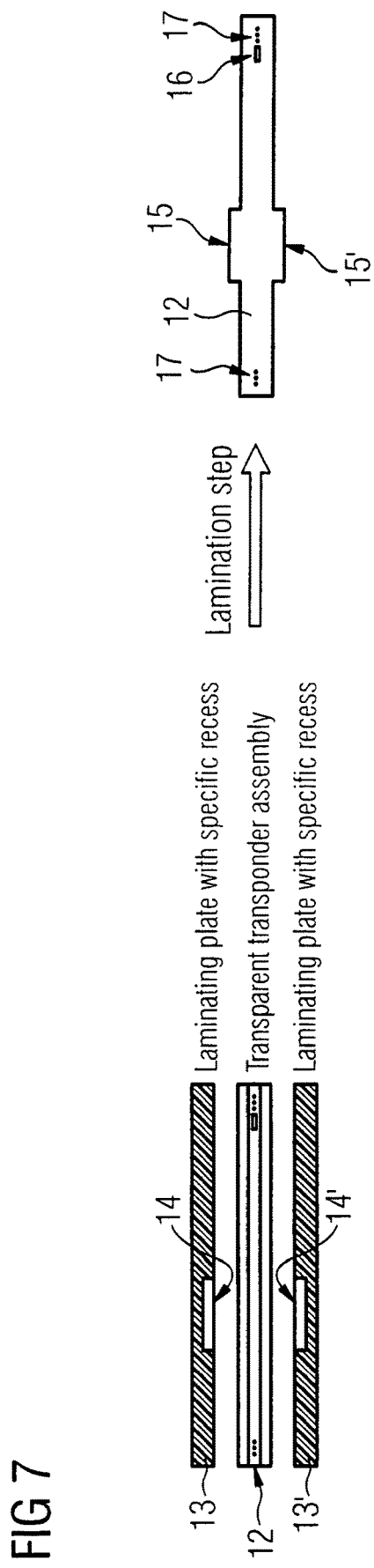
FIG. 7 schematically illustrates an embodiment of the method of the present invention and its result.

In the present invention the method comprises the following steps to manufacture a product, such as contactless card that includes an RFID capability or transponder and other kinds of cards/datapages, with or without electronic means, contact or contactless.

This product comprises several layers to be laminated together. More specifically, it comprises at least a first layer 10 with an opening 11 and a second layer 12 to be laminated on one side of said first layer 10.

Before the lamination of the said first layer 10 with the second layer 12, the method comprises a specific pre-lamination step of the second layer 12 with lamination plates 13 including at least a recess 14 such that the second layer 12 is formed after pre-lamination with a raised portion 15.

This pre-lamination step is illustrated for example in FIG. 7, which shows the result of this specific pre-lamination process, namely a layer 12 with a raised portion 15 on a first side and a raised portion 15' on a second side.

In a non-limiting exemplary embodiment, layer 12 may be a transponder inlay with a chip 16 and a connected antenna 17.

The method further comprises the steps of assembling at least said first layer 10 and said second layer 12, whereby the raised portion(s) 15 of the second layer is(are) placed in the opening 11 of the first layer 10.

Finally, the method comprises the step of laminating the assembled first 10 and second layers 12 after it has been pre-laminated, such that the raised portion 15 of material of the second layer fills at least partially the opening of the first layer. The resulting product is thus as illustrated in FIG. 2 discussed above with an even surface and no collapse 5 (see FIG. 3) at the location of the opening 4.

This initial description concerns a simple and basic explanation of the principle of the invention but it can be applied to other more complicated constructions, for example constructions comprising three layers or more layers, for example one inner layer 12 (which is transparent) and two outer layers 10, 20 and two cover layers 21, 22 as illustrated in FIG. 6.

In such case, the same pre-lamination step may be applied to other layers in accordance with the principles of the present invention.

For example, in FIG. 6, an example of such more complicated construction is illustrated. This embodiment comprises a layer 12 corresponding to layer 12 of FIG. 7. This can be a transponder inlay as described in relation to this FIG. 7. This layer 12 has been subjected to the pre-lamination steps according to the present invention (see FIG. 7) and comprises raised portions 15 on both sides of the layer 12. On both sides of this inlay 12, there are opaque layers/foils 10, 20 with openings 11, 21. Further, the construction comprises covering layers 22 and 23 which are transparent covering foils.

According to the principle of the present invention, the presence of the raised portions 15 prevents the collapse of material from covering layers 22 and 23 into the openings 11 and 21 during lamination thereby maintaining a flat surface on both sides the product.

In a variant, for example useful when layers 10 and 20 are thicker than the raised portions 15 or depending on the materials used, the covering layers 22, 23 may also comprise raised portions in the region of the openings 11 and/or 21 to improve the result. Of course, it is also possible to apply the pre-lamination step according to the present invention only to one covering layer 22 or 23.

The thickness of the raised portion(s) 15 can be chosen in accordance with the circumstances. For example, it may depend on the thickness of the layers involved in the construction, such as the relative thickness of the layers. If the layer with the opening is thicker than the layers with the raised portion, then the raised portion needs to have a certain thickness to ensure proper filling of the opening. Conversely, if the layers with the raised portion are thicker than the layer with the opening, then the raised portion may have a reduced thickness as well. Preferably, raised portion height and thickness of layer should match but variants are possible within the scope of the present invention.

Also, the material used in the layers, in particular the layers with the raised portions, and its characteristics may have an influence. For example, material flow during lamination may have an influence. Typically, the parameters (sizes, thicknesses, etc.) may be adjusted by experimentation.

The present specification is neither intended nor should it be construed as being representative of the full extent and scope of the present invention. The present invention is set forth in various levels of detail in the attached drawings and in the detailed description of the invention and no limitation as to the scope of the present invention is intended by either the inclusion or non-inclusion of elements, components, etc. Additional aspects of the present invention have become more readily apparent from the detailed description, particularly when taken together with the drawings.

While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

For example, as an alternative to the structured lamination plate one may use a plastic foil with openings which have the shape of the window, said foil being placed on the lamination plate. Said foil (made of material such as PTFE, PET or inactivated PC) does not adhere to the inlay material during the pre-lamination step but forms the raised portions one wishes to obtain in accordance with the principles of the present invention. This alternative method is useful and cost efficient for samples, prototypes or small batches of cards.

The invention claimed is:

1. A method for manufacturing a card product with several laminated layers, said method comprising:
   a first pre-lamination step including:

providing a lamination plate having a recess;
providing a second layer;
placing the second layer in contact at least on one side with the lamination plate; and
laminating the second layer using the lamination plate such that a raised portion is formed on the second layer in the recess of the lamination plate;
an assembling step including:
providing a first layer having an opening; and
placing the first layer in contact with the second layer such that the raised portion of the second layer is at least partially placed in the opening of the first layer; and
a lamination step including:
laminating the assembled first and second layers together.

2. The method as defined in claim 1, wherein said method further comprises:
a second pre-lamination step including:
providing a further lamination plate having a recess;
placing the second layer in contact on the other side with the further lamination plate; and
laminating the second layer using the further lamination plate such that a raised portion is formed on an other side of the second layer in the recess of the further lamination plate;
a second assembling step including:
providing a third layer having an opening; and
placing the third layer in contact with the second layer such that the raised portion formed on the other side of the second layer is at least partially placed in the opening of the third layer; and
a lamination step including:
laminating the assembled second and third layers together.

3. The method as defined in claim 2, wherein the lamination step comprises laminating the first, second, and third layers at the same time.

4. The method as defined in claim 3, wherein the first and second pre-lamination steps of said second layer are in parallel.

5. The method as defined in claim 2, wherein said first layer is an opaque layer.

6. The method as defined in claim 5, wherein said second layer is a transparent layer.

7. The method as defined in claim 6, wherein said third layer is an opaque layer.

8. The method as defined in claim 2, further comprising laminating at least one covering layer on at least one of the first or third layers.

9. The method as defined in claim 2, wherein each one of the lamination plates with a recess is formed by a plate and a foil with an opening which is placed on said plate.

10. The method as defined in claim 2, wherein at least one of the first and third layers has flat surfaces on both sides.

11. The method as defined in claim 2, wherein the first and third layers are thinner than the second layer.

12. The method as defined in claim 1, wherein said second layer is an RFID transponder inlay.

13. The method as defined in claim 12, wherein said RFID transponder inlay comprises a chip or chip module and an antenna connected to said chip or chip module.

14. The method as defined in claim 1, wherein laminating the assembled first and second layers together comprises laminating the assembled first and second layers together such that the raised portion of the second layer at least partially fills the opening of the first layer and the card product resulting therefrom has an even surface and no collapse at the location of the opening of the first layer.

15. A card product comprising:
a first layer having an opening; and
a second layer having an integrally formed raised portion, the raised portion being formed by placing the second layer in contact at least on one side with a lamination plate having a recess and the raised portion is formed on the second layer in the recess of the lamination plate;
wherein the first layer is placed in contact with the second layer such that the raised portion of the second layer is placed in the opening of the first layer; and
wherein the first layer and the second layer are laminated together such that the raised portion of the second layer at least partially fills the opening of the first layer and the card product resulting therefrom has an even surface and no collapse at the location of the opening of the first layer.

16. The card product as defined in claim 15, wherein the first layer is thicker than the raised portion of the second layer.

17. A method for manufacturing an RFID transponder, said method comprising:
a first pre-lamination step including:
providing a lamination plate having a recess;
providing an RFID transponder inlay comprising a chip or chip module and an antenna connected to the chip/chip module;
placing a first side of the RFID transponder inlay in contact with the lamination plate; and
laminating the RFID transponder inlay using the lamination plate such that a raised portion is formed on the first side of the RFID transponder inlay in the recess of the lamination plate;
a second pre-lamination step including:
providing a further lamination plate having a recess;
placing a second side opposite to the first side of the RFID transponder inlay in contact with the further lamination plate; and
laminating the RFID transponder inlay using the further lamination plate such that a raised portion is formed on the second side of the RFID transponder inlay in the recess of the further lamination plate;
an assembling step including:
providing a first layer having an opening;
providing a third layer having an opening;
placing the first layer in contact with the MD transponder inlay such that the raised portion on the first side of the RFID transponder inlay is at least partially placed in the opening of the first layer; and
placing the third layer in contact with the second layer such that the raised portion on the second side of the RFID transponder inlay is at least partially placed in the opening of the third layer; and
a lamination step including:
laminating the first layer, the MD transponder inlay and the third layer together with heat and pressure.

18. The method as defined in claim 17, wherein laminating the first layer, the RFID transponder inlay and the third layer together comprises laminating the first layer, the MD transponder inlay and the third layer together such that:
the raised portion formed on the first side of the MD transponder inlay at least partially fills the opening of the first layer; and
the raised portion formed on the second side of the RFID transponder inlay at least partially fills the opening of the third layer;

wherein the RFID transponder resulting therefrom has an even surface and no collapse at each of the location of the opening of the first layer and the location of the opening of the third layer.

19. An RFID transponder card comprising:
a first layer having an opening;
a second layer having an opening; and
an RFID transponder inlay comprising a chip or chip module and an antenna connected to said chip or chip module, the RFID transponder inlay being integrally formed with a first raised portion on a first side of the RFID transponder inlay and a second raised portion formed on an opposite second side of the RFID transponder inlay by at least one lamination step using at least one lamination plate comprising a recess;
wherein the first and second layers are laminated on the first and second sides of the RFID transponder layer such that the raised portions of the RFID transponder inlay are at least partially placed in the respective opening of the first and second layers.

20. The RFID transponder card as defined in claim 19, further comprising:
a covering layer attached to one of the first and second layers, the covering layer being a transparent covering foil and comprising a raised portion in the region of the respective opening of the one of the first and third second layers.

21. The REID transponder card as defined in claim 20, further comprising:
a further covering layer attached to the other of the first and second layers, the further covering layer being a transparent covering foil and comprising a raised portion in the region of the respective opening of the other of the first and second layers.

22. The RFID transponder card as defined in claim 19, wherein at least one of the first and second layers is thicker than the raised portions of the RFID transponder inlay.

* * * * *